US006638632B2

(12) United States Patent
Ohuchi et al.

(10) Patent No.: US 6,638,632 B2

(45) Date of Patent: Oct. 28, 2003

(54) RUBBER COMPOSITION FOR ELASTIC MEMBER AND ELASTIC MEMBER USING SAME

(75) Inventors: Takao Ohuchi, Tokyo (JP); Kouji Takagi, Kanagawa (JP); Kazuya Murata, Tokyo (JP); Toshiaki Arai, Tokyo (JP)

(73) Assignee: Bridgestone Corporation, Tokyo (JP)

(*) Notice: Subject to any disclaimer, the term of this patent is extended or adjusted under 35 U.S.C. 154(b) by 23 days.

(21) Appl. No.: 09/917,881

(22) Filed: Jul. 31, 2001

(65) Prior Publication Data

US 2002/0034395 A1 Mar. 21, 2002

(30) Foreign Application Priority Data

Jul. 31, 2000 (JP) ....................................... 2000-230825
Dec. 22, 2000 (JP) ....................................... 2000-390209

(51) Int. Cl.[7] .................................................. B32B 9/04

(52) U.S. Cl. ....................... 428/448; 252/511; 399/119; 428/413; 428/450; 428/451; 428/474.4; 428/480; 525/100

(58) Field of Search .......................... 399/119; 525/100; 528/450, 448, 451; 252/511; 428/474.4, 480, 413

(56) References Cited

FOREIGN PATENT DOCUMENTS

JP 2000283146 A * 10/2000 ........... F16C/13/00

* cited by examiner

*Primary Examiner*—Robert Dawson
*Assistant Examiner*—Marc S Zimmer
(74) *Attorney, Agent, or Firm*—Sughrue Mion, PLLC

(57) ABSTRACT

There is disclosed a rubber composition comprising (A) butadiene rubber and/or (B) isoprene rubber in the form of liquid and (C) silicone rubber at a {(A)+(B)}/(C) ratio by weight in the range of 97/3 to 5/95. The composition is capable of affording an elastic member which has a low hardness and excellent wear resistance, and which is well suited for use in a variety of part items that are installed in an image formation apparatus such as an electrophotographic apparatus and an electrostatic recording apparatus, including copying machinery, printers, facsimile apparatus and the like, in particular a developing roller. There are also disclosed a developing roller which comprises the above rubber composition, is improved in wear resistance for a developer without causing high hardness thereof, and is capable of affording a steadily favorable image without fail for a long period of time; and further a developing apparatus which comprises the above developing roller.

3 Claims, 1 Drawing Sheet

RUBBER COMPOSITION FOR ELASTIC MEMBER AND ELASTIC MEMBER USING SAME

BACKGROUND OF THE INVENTION

1. Field of the Invention

The present invention relates to a rubber composition for an elastic member and an elastic member using the same. More particularly, the present invention is concerned with a rubber composition capable of affording an elastic member which has a low hardness and also excellent durability, and which is well suited for use in a variety of part items that are installed in an image formation apparatus such as an electrophotographic apparatus and an electrostatic recording apparatus, including copying machinery, printers, facsimile apparatuses and the like, in particular a developing roller; and an elastic member which is composed of the rubber composition, is imparted with the characteristics as mentioned above, and serves in an image formation apparatus.

2. Description of the Related Arts

With regard to an image formation apparatus such as an electrophotographic apparatus and an electrostatic recording apparatus, including copying machinery, printers, facsimile apparatuses or the like, an elastic member comprising a rubber composition has heretofore been employed in the form of a roller, blade, belt or the like, and played a variety of roles in a process, including electrification, development, transfer, toner layer regulation, cleaning, fixing, paper supply and paper transport.

Although it is said that an elastic member which comprises a rubber composition and is used in any of the above-mentioned processes is desired to have a low hardness from the viewpoint of performance, it has been impossible to realize such a low hardness because of several reasons except for the case of using a foam. The reason for a low hardness being desired is its capability of extending the allowable range of design in each process. For instance, however, a foam is difficult to use in a developing roller which supplies a toner onto a photosensitive body from the viewpoints of its durability, fineness of images, its reliability and the like. Likewise, a foam is difficult to use in a paper feed roller which transports recording paper in view of its wear resistance.

In addition, it is desired that the developing roller has a low hardness because of such reasons that toner transport is made easy by favorable contact with a photosensitive body, toner damage is lessened and the like and at the same time, the roller is required to have durability against wear caused by friction with a toner.

With regard to an electrophotographic developing apparatus such as copying machinery, printers, etc., there is previously known a pressurized developing method as an image formation method which comprises supplying a unary toner (developer) to a latent image preserving body such as a photosensitive body which preserves an electrostatic latent image, and visualizing the latent image by allowing the toner to adhere to the latent image (refer to U.S. Pat. Nos. 3,152,012 and 3,731,146).

The pressurized developing method carries out the image formation by bringing a developing roller that supports a toner into contact with a latent image preserving body (photosensitive body) preserving an electrostatic latent image, and allowing the toner to adhere to the latent image on the surface of the afore-said latent image preserving body, whereby the developing roller is required to be constituted of an electroconductive elastic body having both electroconductivity and elasticity.

Specifically in the foregoing pressurized developing method the constitution is such that, for instance, as illustrated in FIG. 1, a developing roller 1 is placed between a toner application roller 5 for toner supplying and a latent image preserving body 6 (photosensitive body) preserving an electrostatic latent image; the developing roller 1, the latent image preserving body 6 (photosensitive body) and the toner application roller 5 rotate each in the direction of the arrow in FIG. 1, thereby a toner 7 is supplied onto the surface of the developing roller 1 with the toner application roller 5, and is arranged into a uniform thin film by a layer forming blade 8; the developing roller 1 rotates in the state that the toner 7 is so arranged, while being in contact with the latent image preserving body 6 (photosensitive body) ; and the toner thus formed into a thin film is allowed to adhere to an latent image on the latent image preserving body 6 from the developing roller 1, whereby the aforesaid latent image is visualized. Symbol 9 indicates a transfer portion, where a toner image is transferred to a recording medium such as paper. Symbol 10 indicates a cleaning portion, where the cleaning blade 11 removes the toner which remains after the transfer on the surface of the latent image preserving body 6.

In such developing apparatus by means of the pressurized developing method as mentioned above, the developing roller 1 is obliged to rotate, while maintaining the state of close contact with the latent image preserving body 6. For this reason, the constitution of the developing roller 1 is such that as illustrated on the schematic cross-section of FIG. 2, a shaft 2 consisting of an electroconductive material such as a metal is equipped on its outside periphery with an electroconductive elastic layer 3 which is composed of an electroconductive elastic body which is imparted with electroconductivity by blending an electroconductivity imparting agent in elastic rubber such as silicone rubber, acrylonitrile butadiene rubber, ethylene propylene rubber and polyurethane rubber or foam thereof. In addition, a coating layer 4 composed of a resin or the like is installed on the surface of the electroconductive elastic layer 3 for the purpose of controlling electrostatic property and adhesivity for the toner 7, of controlling the force of friction between the latent image preserving body 6 and the layer forming blade 8, or of preventing fouling of the latent image preserving body 6 due to the elastic body.

In the case of performing the development of electrostatic latent images by using the developing roller such as the above through the pressurized developing method, the end surface of the developing roller is worn by the friction with the toner and the like that are left and accumulated on the end portion of the developing roller without serving for the development. This wear becomes the cause for generating a defective image and further for deteriorating the durability of the developing roller. In the case of performing the development of electrostatic latent images through the pressurized developing method, when the hardness of the surface of the developing roller is increased in order to enhance the wear resistance of the roller, the area of contact between the roller and the latent image preserving body such as a photosensitive body is decreased, thus resulting in failure to carry out favorable development as the case may be. In addition, an excessively high hardness of the surface of the developing roller often causes a damage to the latent image preserving body. What is more, an excessively high hardness of the developing roller itself causes a damage to a developer as the case may be because of an overload applied thereto between the roller and a layer regulating blade which is in butt contact with the roller.

SUMMARY OF THE INVENTION

Under such circumstances, a general object of the present invention is to provide a rubber composition capable of affording an elastic member which has a low hardness and excellent durability as well, and which is well suited for use in a variety of part items that are installed in an image formation apparatus such as an electrophotographic apparatus and an electrostatic recording apparatus, including copying machinery, printers, facsimile apparatuses and the like, in particular a developing roller; and an elastic member for an image formation apparatus which member is imparted with the characteristics as mentioned above by using the rubber-composition.

Another object of the present invention is to provide a developing roller which is capable of enhancing wear resistance for a developer without bringing about a high hardness of the roller, and a developing apparatus equipped with the developing roller.

Further objects of the present invention will be made obvious from the content of the specification hereinafter disclosed.

In such circumstances, intensive research and development were accumulated by the present inventors in order to solve the problems and thus achieve the above-mentioned objects. As a result, it has been found that the objects are achievable by a rubber composition comprising butadiene rubber and/or isoprene rubber in liquid form and silicone rubber each at a specific proportion.

In addition, it has been found that a developing roller which is enhanced in wear resistance for a developer is obtainable by forming an electroconductive elastic layer comprising the foregoing rubber composition on the outside periphery of a shaft having good electroconductivity without bringing about a high hardness of the roller.

That is to say, the present invention provides a rubber composition for an elastic member to be used in an image formation apparatus which composition comprises (A) butadiene rubber and/or (B) isoprene rubber in the form of liquid and (C) silicone rubber at a {(A)+(B)}/(C) ratio by weight in the range of 97/3 to 5/95.

Moreover, the present invention provides an elastic member for an image formation apparatus which member comprises the above-mentioned rubber composition for an elastic member.

Further, the present invention provides a developing roller which comprises a shaft having good electroconductivity and an electroconductive elastic layer formed on the outside periphery of said shaft, supports a developer on its surface to form thin films thereof and in this state, rotates in contact with or in close vicinity to a latent image preserving body that preserves an electrostatic image on its surface, and thus supplies the developer to the surface of the latent image preserving body so as to visualize an electrostatic image on the surface of the latent image preserving body, said electroconductive elastic layer being composed of a rubber composition comprising (A) butadiene rubber, (B) isoprene rubber in the form of liquid and (C) silicone rubber at a {(A)+(B)}/(C) ratio by weight in the range of 97/3 to 5/95.

Furthermore, the present invention provides a developing apparatus comprising a latent image preserving body capable of preserving an electrostatic image on the surface thereof and a developing roller which is placed so as to rotate in contact with or in close vicinity to the latent image preserving body, which supports a developer on its surface to form thin films thereof and which supplies the developer to the surface of the latent image preserving body so as to visualize an electrostatic image on the surface of the latent image preserving body, wherein the developing roller in the preceding item is used as the developing roller.

DETAILED DESCRIPTION OF THE INVENTION

Figure 1:
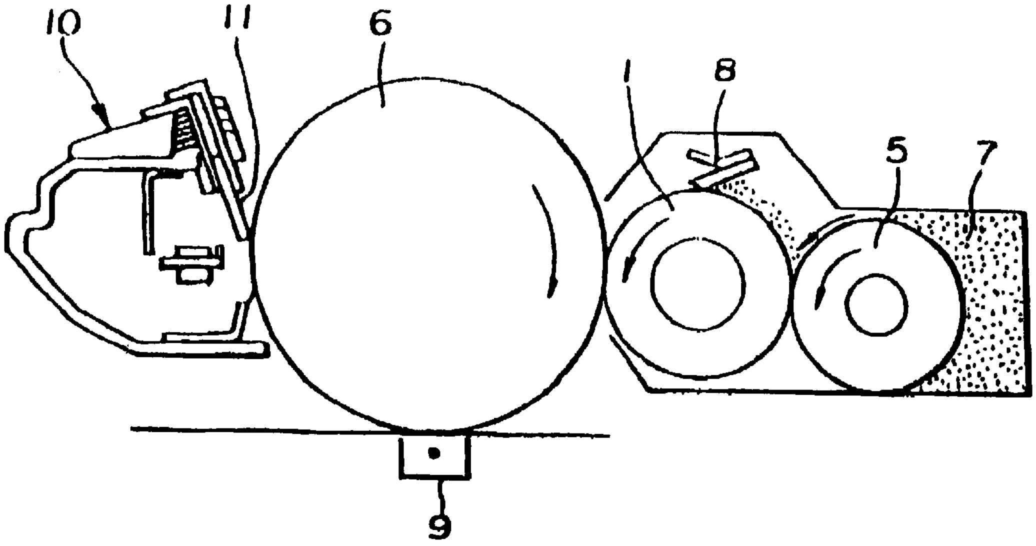
FIG. 1 is a schematic cross-sectional view showing an image formation apparatus equipped with a developing apparatus according to the present invention.

The rubber composition according to the present invention, which is used for elastic members of a variety of part items that are installed in an image formation apparatus such as an electrophotographic apparatus and an electrostatic recording apparatus, comprises (A) butadiene rubber and/or (B) isoprene rubber in the form of liquid and (C) silicone rubber.

The content ratio by weight of the components {(A)+(B)} to the component (C) is set in the range of 97:3 to 5:95. The content ratio departing from the above-mentioned range gives rise to such a disadvantage as imbalance between the desirable physical properties and the manufacturing cost of the rubber composition. The content ratio is preferably 90:10 to 15:85, more preferably 90:10 to 10:90, particularly preferably 85:15 to 15:85.

It is preferable that the butadiene rubber as the component (A) has a weight average molecular weight Mw of at least 300,000 with a view to assure the physical properties of the rubber. The isoprene rubber in the form of liquid as the component (B) which has a weight average molecular weight Mw of 100,000 or more is undesirable because of its being liable to solidification, thus causing poor dispersing performance at the time of production. Accordingly, the isoprene rubber as the component (B) preferably has a weight average molecular weight Mw of less than 100,000. On the other hand, it is preferable that the silicone rubber as the component (C) has a fundamental molecular structure represented by the general formula (I)

$$-[SiR_2-O-SiR_2-O-SiR_2-O]_n- \qquad (I)$$

wherein R is a methyl group, a vinyl group, a phenyl group or a trifluoropropyl group, and n is the number of repetition.

The rubber composition having such properties according to the present invention, which has a low hardness and excellent wear resistance, is used for elastic members of a variety of part items that are installed in an image formation apparatus. The elastic members may be any of non-foamed or foamed elastic members.

In the case where the elastic member which is obtained by the use of the rubber composition according to the present invention is required to have electroconductivity, the rubber composition may be incorporated with an electroconductivity imparting agent as the component (D).

The above-mentioned electroconductivity imparting agent as the component (D) is classified into ionic electroconductivity imparting agent and electronic electroconductivity imparting agent (electroconductive powder). Examples of the ionic electroconductivity imparting agent include ammonium salts such as perchlorates, chlorates, hydrochlorides, bromates, iodates, borofluorides, sulfates, alkyl sulfates, carboxylates, sulfonates and the like, of any of tetraethyl ammonium, tetrabutyl ammonium, dodecyltrimethyl ammonium such as lauryltrimethyl ammonium, hexadecyltrimethyl ammonium, octadecyltrimethyl ammonium such as stearyltrimethyl ammonium, benzyltrimethyl ammonium, modified aliphatic dimethylethyl ammonium and the like; perchlorates, chlorates, hydrochlorides, bromates, iodates, borofluorides, trifluoromethyl sulfates, sulfonates and the like, of any of alkali metals such as lithium, sodium and potassium, or alkaline earth metals such as calcium and magnesium.

Examples of the electronic electroconductivity imparting agent include electroconductive carbon black such as ketchen black and acetylene black; carbon black for rubber such as SAF, ISAF, HAF, FEF, GPF, SRF, FT and MT; oxidation treated carbon black for ink; thermally cracked carbon black; natural graphite; artificial graphite; electroconductive metal oxide such as antimony doped tin oxide, titanium oxide and zinc oxide; and metals such as nickel, copper, silver and germanium each in the form of powder or oxide; and electroconductive polymer such as polyaniline, polypyrrole and polyacetylene. Of the above-cited electronic electroconductivity imparting agent, carbon black for rubber is preferable in view of its inexpensiveness and easiness of controlling electroconductivity in a small amount.

With a view to minimize the amount to be used and at the same time, assure the electroconductivity, it is preferable that the carbon black has a DBP (dibutyl phthalate) oil absorption of preferably at least 100 ml/100 g, particularly preferably at least 120 ml/100 g.

The above-exemplified electroconductivity imparting agent may be used alone or in combination with at least one other. The blending amount thereof is not specifically limited. In the case of the ionic electroconductivity imparting agent, the blending amount thereof is usually 0.01 to 5 parts by weight, preferably 0.05 to 2 parts by weight based on 100 parts by weight of the total sum of the components (A) and (B). In the case of the electronic electroconductivity imparting agent, the blending amount thereof is usually 1 to 50 parts by weight, preferably 5 to 40 parts by weight based on 100 parts by weight of the total sum thereof.

In the case where the elastic member which is obtained by using the rubber composition according to the present invention is a developing roller, the specific volume resistance of the elastic member is regulated preferably to $10^3$ to $10^{10}$ Ω·cm, particularly preferably to $10^4$ to $10^9$ Ω·cm.

The above-mentioned rubber composition according to the present invention may optionally properly be incorporated when desired, with any of various well known additives such as fillers, crosslinking agents (vulcanizing agent) and additives for rubber in addition to the foregoing electroconductivity imparting agent.

In the case where the above-mentioned elastic member is a developing roller, it is preferable to set the hardness of the elastic member in the range of 35 to 90 degrees, in particular 40 to 75 degrees expressed in terms of Asker C hardness. The Asker C hardness, when exceeding 90 degrees, brings about a fear of failure to carry out favorable image formation due to too hardened developing roller and decreased area of contact with the photosensitive body and besides, often gives rise to damage to a toner and excessively high friction with the latent image preserving body or the layer forming blade, thus causing defective images such as jitter.

The present invention also provides an elastic member which is obtainable by the use of the present rubber composition. The elastic member, which is used for a variety of part items that are installed in an image formation apparatus such as electrophotographic equipment and electrostatic recording equipment, is particularly well suited for use as a developing roller as one aspect of the present invention.

The developing roller comprises a highly electroconductive shaft and an electroconductive elastic layer which is composed of the rubber composition according to the present invention and which is placed on the outside periphery of the aforesaid shaft. The roller is imparted with such functions as supplying a developer to the latent image preserving body with in a state of being contact therewith or in close vicinity thereto, and forming a visible image on the surface thereof.

It is preferable to equip the foregoing developing roller with a resin coating layer which is composed of a crosslinkable resin such as melamine resin, phenolic resin, alkyd resin, fluororesin, polyamide resin, silicone resin or a mixture of any of the exemplified resins and which is placed on the surface of the electroconductive elastic layer to control the charging property and adhesivity, to control the force of friction between the latent image preserving body and the layer regulating layer, and to prevent the latent image preserving body from being polluted by the electroconductive elastic layer.

In the developing roller, the foregoing resin coating layer has preferably a thickness of 1 to 100 μm.

The crosslinkable resin may be incorporated when desired, with any of a variety of additives such as a charge control agent, a lubricant, an electroconductivity imparting agent and an other resin. The resin coating layer can usually be formed by a method comprising the steps of preparing a coating solution by dissolving or dispersing the crosslinkable resin, a crosslinking agent and various additives in a proper solvent (exemplified by alcohol based solvents such as methanol; ketone based solvents such as methyl ethyl ketone; aromatic hydrocarbon based solvents such as toluene); applying the resultant coating solution onto the electroconductive elastic layer by a dipping method, roll coater method, doctor blade method, spray method or the like; and thereafter drying and curing the coating at ordinary temperature or an elevated temperature in the range of 50 to 170° C.

In the developing roller, the resin coating layer has a specific volume resistance in the range of preferably $10^7$ to $10^{16}$ Ω·cm, particularly preferably $10^9$ to $10^{14}$ Ω·cm.

Figure 2:
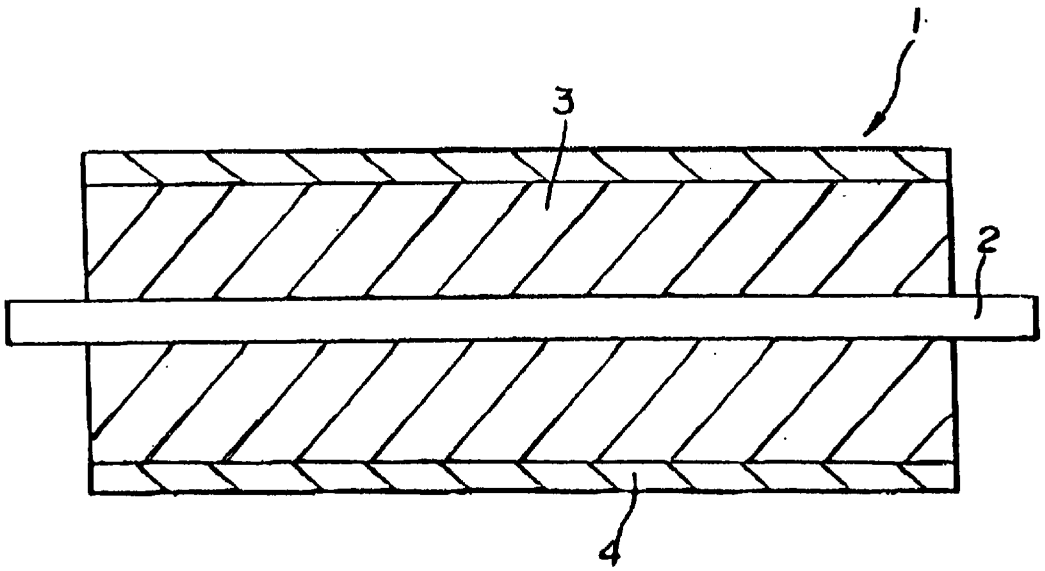
FIG. 2 is a schematic cross-sectional view showing an example of a developing roller which is one embodiment of an elastic member according to the present invention.

FIG. 2 is a schematic cross-sectional view showing one example of a developing roller as one embodiment of an elastic member according to the present invention. The constitution of the developing roller is such that developing roller 1 comprises a highly electroconductive shaft 2, an electroconductive elastic layer 3 placed on the outside periphery of the shaft, and preferably a resin coating layer 4 formed on the surface of the layer 3. Any shaft is usable as the shaft 2, provided that it has good electroconductivity, and use is usually made of a metallic shaft such as a core metal composed of a metallic solid body and a metallic cylinder made by hollowing out a core metal. The metallic shaft is exemplified by a shaft composed of a steel material such as sulfur free cutting steel plated with zinc or the like, aluminum, stainless steel, phosphor bronze or the like.

The elastic member according to the present invention is employed as a developing roller or the like in a state of being incorporated in a developing apparatus in electrophotographic equipment, etc. As illustrated in FIG. 1, a developing roller according to the present invention is placed as the developing roller 1 between the toner application roller 5 for supplying a toner and a photosensitive drum (latent image preserving body) 6 preserving an electrostatic latent image; and the toner 7 is supported on the toner application roller 5, arranged into uniform thin film by the layer forming blade 8, supplied from the thin film to the photosensitive drum (latent image preserving body) 6 and allowed to adhere to an latent image on the photosensitive drum (latent image preserving body) 6, whereby the latent image is visualized. The detailed description of the developing apparatus, which has already been given in the foregoing Description of Related Arts, is omitted here.

The image formation apparatus which is equipped with the developing roller is not limited to the apparatus as illustrated in FIG. 1. Any image formation apparatus is usable, provided that the apparatus is such that the developing roller supports a developer on the surface thereof to form thin layer of the developer and in this state, supplies the developer to the surface of the image formation body, while being in contact with or in close vicinity to the image formation body, and thereby forms a visible image on the image formation body. For instance, the image formation apparatus may be such an apparatus in which paper sheets such as paper, OHP paper sheet or the like is used as an image formation body, and the developer which is supported on the developer carrier is made to jump over directly onto the image formation body through the holes that are made in a control electrode so as to directly form an image on the paper or OHP paper sheet.

The developer to be supported on the developer carrier is preferably a non-magnetic unary developer, but a magnetic unary developer is also usable. For instance, also in the case of carrying out white and black image printing by the use of a magnetic unary developer, it is possible to favorably use the developing roller and the developing apparatus each according to the present invention.

As described hereinbefore, the rubber composition according to the present invention is capable of affording the elastic member which has a low hardness and excellent wear resistance, and is well suited for use in a variety of part items, particularly, a developing roller that are installed in an image formation apparatus such as electrophotographic equipment and electrostatic recording equipment, including copying machinery, printers and facsimile apparatuses.

In addition, the developing roller according to the present invention which roller comprises the above-described rubber composition for elastic members is improved in wear resistance for a developer without causing a high hardness of the roller, and is capable of assuring satisfactory images without fail for a long period of time.

In the following, the present invention will be described in more detail with reference to comparative examples and working examples, which however shall never limit the present invention thereto.

EXAMPLES 1 to 3

Comparative Examples 1 & 2

The rubber compositions each having a chemical composition as given in Table 1 were each cast into a mold, and cured under the vulcanization conditions of 150° C. and one hour to prepare a developing roller composed of a metallic shaft and an electroconductive elastic layer which was formed on the outer periphery of the shaft, and which had a diameter of 20 mm and a length of 398 mm. Measurements were made of the specific volume resistance of the developing rollers thus prepared by the following manner. Subsequently, the developing rollers were each mounted on a color laser printer, and subjected to continuous printing for 60 hours. After the completion of the printing, the rollers were examined for wear on the surfaces. Table 1 gives the results evaluated in accordance with the following criteria.

(1) Specific Volume Resistance

Specific volume resistance ρ was calculated by the following formula from the resistance of the electroconductive roller.

$$R=(\rho r_2/Ld)\ \ln\ (r_2/r_1)$$

where R: resistance of the electroconductive roller

ρ: specific volume resistance of the electroconductive elastic layer

L: contact length in the direction of the shaft d: nip width $r_1$: radius of the shaft $r_2$: outside radius of the electroconductive roller In: natural logarithm (2) Resistance of the Electroconductive Roller Each of specimens was pressed to a copper sheet by applying a load of 4.9 N on both the ends thereof, and a voltage of 100 V was impressed thereto by the use of a resistivity testing meter (manufactured by Advantest Corporation under the trade name R8340A) to measure the resistance thereof.

(3) Wear on the Surface of the Developing Roller

<Evaluation Criteria>

○: no wear observed at all

Δ: somewhat trace of wear observed

X: obvious wear observed from traces likely to have been scraped off at a roller end.

TABLE 1

| | Example | | | Comp. Example | |
|---|---|---|---|---|---|
| | 1 | 2 | 3 | 1 | 2 |
| Rubber Composition (parts by weight) | | | | | |
| Rubber Material | | | | | |
| Butadiene rubber[1)] | 70 | 65 | 45 | 75 | 85 |
| Isoprene rubber in liquid form[2)] | 25 | 25 | 25 | 25 | 25 |
| Silicone rubber | 5 | 10 | 30 | 0 | 0 |
| Electroconductivity Imparting Agent·Carbon[3)] | 30 | 30 | 30 | 30 | 30 |
| Vulcanizing Agent Peroxide | 1.5 | 1.5 | 1.5 | 1.5 | 1.5 |
| Other Additives | | | | | |
| Stearic acid | 5 | 5 | 5 | 5 | 5 |
| Zinc oxide | 5 | 5 | 5 | 5 | 5 |
| Asker C Hardness | 63 | 61 | 55 | 65 | 70 |
| Specific Volume Resistance 100 V (Ω · cm) | $10^{5.8}$ | $10^{5.6}$ | $10^{5.3}$ | $19^{6.2}$ | $10^{6.8}$ |
| Wear on the Surface of Developing Roller | Δ | ○ | ○ | X | X |

Remarks

[1)]Butadiene rubber: weight average molecular weight (Mw) of 600,000

[2)]Isoprene rubber in liquid form: weight average molecular weight (Mw) of 20,000

[3)]Carbon; carbon black having DBP oil absorption of 150 ml/100 g

EXAMPLE 4

A phenolic resin coating layer was formed on the surface of the roller which had been obtained in Example 3, and the roller equipped with the coating layer was tested in the same manner as in Examples 1 to 3. As a result, no wear was observed on the surface at all as was the case with Example 3.

What is claimed is:

1. A developing roller which comprises an electroconductive shaft and an electroconductive elastic layer formed on the outside periphery of said shaft; said electroconductive elastic layer being composed of a rubber composition comprising (A) butadiene rubber, (B) isoprene rubber in the form of liquid and (C) silicone rubber at a {(A)+(B)}/(C) ratio by weight in the range of 97/3 to 5/95, wherein a resin coating layer is formed on the surface of the electroconductive layer.

2. The developing roller according to claim 1, wherein a resin which constitutes the resin coating layer is at least one resin selected from the group consisting of melamine resin, phenolic resin, alkyd resin, fluororesin and polyamide resin.

3. A developing apparatus which comprising a latent image preserving body and a developing roller which is placed so as to rotate in contact with or in close vicinity to the latent image preserving body, wherein the developing roller in claim 1 or 2 is used as the aforesaid developing roller.

* * * * *